United States Patent [19]

Margotte et al.

[11] 3,856,886

[45] Dec. 24, 1974

[54] BLENDS OF POLYCARBONATE GRAFTS ON VINYL POLYMERS WITH POLYCARBONATES AND/OR VINYL POLYMERS

[75] Inventors: Dieter Margotte, Krefeld; Hugo Vernaleken, Krefeld-Bockum; Hermann Schnell, Krefeld-Uerdingen, all of Germany

[73] Assignee: Bayer Aktiengesellschaft,, Leverkusen, Germany

[22] Filed: Mar. 30, 1972

[21] Appl. No.: 239,717

[30] Foreign Application Priority Data
Apr. 24, 1970 Germany............................ 2019992
Apr. 24, 1970 Germany............................ 2019994
Apr. 24, 1970 Germany............................ 2019993

[52] U.S. Cl........ 260/873, 260/47 UA, 260/47 XA, 260/49, 260/876 R
[51] Int. Cl............................................. C08g 39/10
[58] Field of Search.................. 260/873, 47 UA, 49

[56] References Cited
UNITED STATES PATENTS

| | | | |
|---|---|---|---|
| 3,280,078 | 10/1966 | Hostettler et al.................. | 260/873 |
| 3,461,187 | 8/1969 | Cantrell.............................. | 260/873 |
| 3,462,515 | 8/1969 | Cantrill.............................. | 260/873 |
| 3,670,051 | 6/1972 | Senge................................. | 260/873 |
| 3,692,870 | 9/1972 | Schnell.............................. | 260/861 |

FOREIGN PATENTS OR APPLICATIONS

| | | | |
|---|---|---|---|
| 1,227,657 | 4/1971 | Great Britain...................... | 260/873 |
| 6,716,729 | 8/1967 | Netherlands....................... | 260/873 |

Primary Examiner—Melvin Goldstein
Assistant Examiner—Edward Woodberry
Attorney, Agent, or Firm—Gene Harsh

[57] ABSTRACT

This invention relates to thermoplastic graft copolymers of a polymer backbone having aromatic hydroxy groups and an aromatic polycarbonate grafted onto said backbone via the aromatic hydroxy groups, and more especially to blends of said graft copolymer with aromatic polycarbonates and/or polymers of olefinically unsaturated monomers.

19 Claims, No Drawings

BLENDS OF POLYCARBONATE GRAFTS ON VINYL POLYMERS WITH POLYCARBONATES AND/OR VINYL POLYMERS

This application is a continuation-in-part of application Ser. No. 137,050, filed Apr. 23, 1971, now abandoned.

This invention relates to thermoplastic graft copolymers of a polymer backbone having aromatic hydroxy groups and an aromatic polycarbonate grafted onto said backbone via the aromatic hydroxy groups, and more especially to blends of said graft copolymer with aromatic polycarbonates and/or polymers of olefinically unsaturated monomers.

Polycarbonates have excellent thermal and mechanical properties. However, they exhibit a reduced stability to alkalies and to water when the moulded bodies are exposed to permanent tensile stress. More advantageous flow properties are also desirable.

The present invention provides compositions which are improved in this respect and are particularly suitable for moulding.

These compositions are blends comprising:

A. thermoplastic graft copolymers of a polymer backbone having aromatic hydroxy groups and an aromatic polycarbonate grafted onto said backbone by way of said aromatic hydroxy groups, and B. polymers of olefinically unsaturated monomers or / and C. aromatic polycarbonates.

The backbones of the graft copolymers consist essentially of carbon chains having bonded thereto directly or indirectly aromatic radicals having aromatic hydroxy groups; they contain less than 2 %, such as 0.1 - 1.5 %, preferably 0.2 - 0.8 % by weight of phenolic hydroxyl groups. They are obtained by copolymerizing a) monomers containing polymerizable olefinically unsaturated groups and aromatic groups having aromatic hydroxy groups or masked aromatic hydroxy groups and b) olefinically unsaturated monomers devoid of aromatic hydroxy groups which are copolymerizable with said monomers.

Suitable monomers having aromatic hydroxyl groups are: Monomers of the formula

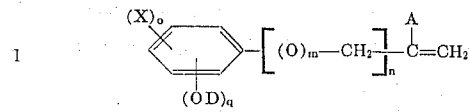

wherein A is hydrogen or methyl, X is halogen or a methyl group, D is hydrogen or a chlorocarbonic acid ester, monophenyl carbonic acid ester or trimethyl-silyl group, $m$ is zero (preferred) or 1, $n$ is zero (preferred) or 1, $o$ is zero, 1 or 2, $q$ is 1 (preferred) or 2. Such monomers are for instance o-, m- or p-isopropenylphenol, p-isopropenyl-o-cresol, 2,6-dichloro-p-isopropenylphenyl, m- or p-vinyl phenol, p-vinyl-o-cresol, p-allylphenol, m-allyloxy-phenol, 3,4-dihydroxyallylbenzene, their chlorocarbonic acid or monophenyl-carbonic acid esters or the corresponding trimethyl-silane derivatives.

Suitable monomers to be copolymerized with the above unsaturated phenols are ethylene, propylene, isobutylene, vinyl chloride, vinylidene chloride, acrylic and methacrylic acid, alkyl esters and amides, acrylo- and methacrylonitrile, vinyl acetal, vinyl propionate, vinyl benzoate, vinyl-, methyl-, ethyl- and isobutyl ether, styrene, α-methylstyrene, vinyl toluene, p-ethyl styrene, 2,4-dimethylstyrene, ortho-chlorostyrene and 2,5-dichlorostyrene, these compounds being used individually or in mixtures with one another. The preferred monomers are styrene, acrylonitrile and acrylic- or methacrylic acid esters with monohydric aliphatic or cycloaliphatic alcohols having 1 to 6 carbon atoms.

Such vinyl monomers are mentioned e.g. in the U.S. Pat. No. 3,255,119.

The preparation of the copolymers which are to be used as spine or backbone for the production of the grafted polymers is carried out according to known methods as they are disclosed in U.S. Pat. No. 3,687,895. The number average molecular weights of the copolymers is between 10,000 and 200,000 preferably between 20,000 and 50,000.

For preparing the graft copolymers the above copolymers having phenolic hydroxy groups or masked phenolic hydroxy groups are reacted with a dihydric phenol and a polycarbonate forming derivative of carbonic acid, a so-called carbonate precursor, such as carbonyl halides or haloformates, under polycarbonate forming conditions known as such.

Suitable dihydric phenols are hydroquinone, resorcinol, 4.4'-dihydroxydiphenyl, bis-(4-hydroxyphenyl)alkanes, 1.1-bis-(hydroxyphenyl)-cycloalkanes, -ethers, -sulphides, -ketones, sulphoxides and -sulphones, as well as bisphenols which are substituted in the phenyl radicals by halogen atoms, such as chlorine, bromine, or by methyl- or other alkyl groups. Prefered are the bis-2-(4-hdyroxyphenyl)-propane (Bisphenol A), bis-2-(4-hydroxy-3.5-dichloro-phenyl)-propane (Tetrachlorbis-phenol A), bis-2-(4-hydroxy-3.5-dibromo-phenyl)-propane (Tetrabrombisphenol A), bis-2-(4-hydroxy-3.5-dimethyl-phenyl)-propane and α,α'-bis-(hydroxy-phenyl)-diisoalkyl-benzenes e.g. α,α-bis-(4-hydroxy-phenyl)-p-diisopropylbenzene. The grafted products have incorporated therein about 5 - 50 %, preferably 10 - 20 % by weight of the above disclosed backbone copolymer.

The preparation of the grafted products is nearer, i.e., more precisely disclosed in the aforementioned U.S. Pat. No. 3,687,895.

The grafted products may be illustrated by the following formula:

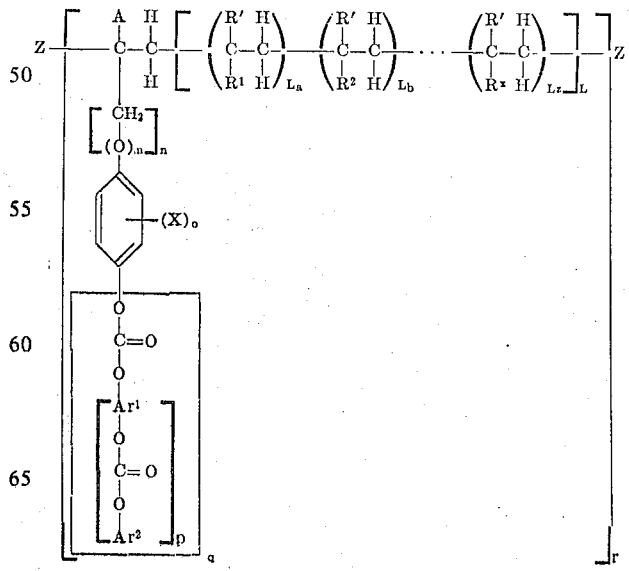

in which $R^1, R^2 \ldots R^x$ may be identical or different and denote hydrogen or halogen or an alkyl radical having up to 6 carbon atoms or an aryl radical, an ester group of a monohydric alcohol, an amide, nitrile, carboxylic acid ester or an alkyl ether group;

$R'$ is hydrogen or the methyl group;

A is hydrogen or the methyl group; is halogen or the methyl group;

$Ar^1$ is a bivalent aromatic radical which may be substituted in the nucleus;

$Ar^2$ is a monovalent aromatic radical which may be substituted in the nucleus, or means the radical $Ar^1$ with one hydroxyl group;

L is a number from 1 to 200.

m is zero or 1;

n is zero or 1;

o is zero, 1 or 2;

p is an integer from 5 to 100;

q is 1 or 2; and r is an integer from 1 to 10,

Z is a radical derived from an initator e.g.

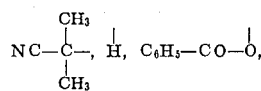

or

(See Vollmert, Grundriβ der Makromolekularen Chemie, Springer-Verlag Berlin-Göttingen-Heidelberg, 1962, page 37 ff.)

According to one modification of the invention the above grafted products are blended with polymers of olefinically unsaturated monomers (vinyl-polymers). These blends may contain 5 – 95 % by weight of said vinyl-polymers.

Those vinyl-polymers can be homo- or copolymers for example of the monomers mentioned from page 8 line 2 to page 8 line 13 of the instant application. These vinyl-polymers can be obtained according known methods e.g. by polymerization of the corresponding monomers with catalysts known in the art e.g. azo-compounds (azo-diisobutyronitrile) or peroxides (benzoylperoxide).

Compared with polycarbonate but also with polycarbonate-grafted copolymers, these moulding materials are characterized by an appreciably improved stability to alkali and hot water. Their mechanical properties are similar to those of pure polycarbonate-grafted copolymers. Furthermore, the new moulding materials have excellent flow properties, even if the proportion of polycarbonate is high. The products, obtained, and can be thermoplastically processed and are particularly suitable for producing articles which must have a high resistance to hydrolysis, such as crockery, surgical instruments containers and the like.

The surprising feature of the invention is particularly apparent when it is borne in mind that, in general, polycarbonate is not compatible with other thermoplasts and synthetic materials, especially with vinyl polymers, and that the incorporation of only small amounts of these substances in polycarbonate leads to a deterioration of the polycarbonate properties and to demixing. The incompatibility of vinyl is that the phases separate or the mixed solutions become turbid. Films and foils produced from these solutions are usually opaque and have unsatisfactory mechanical stabilities. Admittedly, this effect sometimes appears only when the foils are tempered for a prolonged time. In the case of thicker moulded articles, however, the incompatibility can be recognised from the breaking properties; the points of fracture show a white indistinct break. Surprisingly, these phenomena of incompatibility cannot be observed in the moulding materials according to the invention.

As has already been mentioned, the hydrolysis stability of the copolymers is likewise improved by the admixing of vinyl polymers. For example, a flat rod (length 12 cm; width 1 cm; thickness 0.4 cm) of a mixture of 10 per cent by weight of a styrene/acrylonitrile copolymer and 90 per cent by weight of a grafted copolymer [graft base (5 parts by weight): 78 parts by weight styrene, 17 parts by weight acrylonitrile and 5 parts by weight isopropenylphenol-trimethylsilyl ether; graft (95 parts by weight): polycarbonate from 4,4'-dihydroxydiphenyl-propane-2,2] breaks in a concentrated wetting agent solution (pH 12) at 60°C under a bending stress of 800 kg/sq. cm only after about 24 hours, whereas the pure grafted copolymer breaks already after 6 hours and polycarbonate based on bis-2-(4-hydroxy-phenyl)-propane breaks after 1 hour.

Mixtures with high proportions of vinyl polymers also exhibit a substantial improvement of the flow properties. This becomes particularly apparent when measuring the melting viscosity under high shearing rates such as occur in injection moulding to produce moulded articles. On the other hand, moulding materials with high proportions of vinyl polymers have an improved thermal stability, compared with pure vinyl polymers. The MARTENS degree according to VDE 0302 of, for example, polystyrene amounts to 71°C and can be increased to over 80°C by admixing a grafted copolymer. These products are suitable for articles having improved resistance to heat. (The Martens degree is a characteristic number of the stability of shape at high temperatures which corresponds to a heat deflection temperature and which is measured with a mathematical bending stress of 50 kg/sqm.)

Suitable vinyl polymers for blending are homo- and/or copolymers of vinyl monomers, such as ethylene, propylene, butadiene, vinyl acetate, vinyl benzoate, vinyl isobutylether, acrylamide, methacrylamide, N-methoxy-methyl-metacrylamide, acrylonitrile, methacrylonitrile, acrylic acid esters and methacrylic acid esters, e.g. methyl methacrylate, cyclohexyl methacrylate, ethyl acrylate and butyl acrylate, furthermore styrene, vinyl-toluene, 2,4-dimethyl-styrene, chlorostyrene and α-methyl-styrene or others mentioned in U.S. Pat. No. 3 225 119. The preferred polymers are polystyrene, copolymers of styrene and acrylonitrile and polyacrylates or -methacrylates, preferably polymethylmethacrylates, or graft copolymer like the known ABS-type-copolymers (See e.g. U.S. Pat. No. 2,820,773).

The amounts given in the following Examples are parts by weight; the relative viscosities are measured on methylene chloride solutions (0.5 g substance in 100 ml) at 25°C.

EXAMPLE 1

90 Parts of a polycarbonate-grafted vinyl copolymer with a relative viscosity of 1.336 [graft base(5 parts): 78 parts styrene, 17 parts acrylonitrile and 5 parts p-isopropenylphenol-trimethylsilyl ether; graft (95 parts): polycarbonate from 4,4'-dihydroxydiphenylpropane-2,2] are mixed with 10 parts of a copolymer from 80 parts styrene and 20 parts acrylonitrile (molecular weight MW about 340,000) in a worm at 290°C and the mixture is extruded.

Compared with the pure grafted copolymer, the moulded articles produced there from are characterised by an improved stability to alkalies which can be measured as follows: a flat rod (length 12 cm; width 1 cm; thickness 0.4 cm) is subjected at 60°C in a concentrated wetting agent solution (pH 12) to a bending stress of 800 kg/sq.cm (rinsing test). Whereas a flat rod of the grafted copolymer alone shows cloudiness already after 5 hours and breaks after 6 hours, a rod produced from the mixture shows cloudiness only after about 20 hours; breaking occurs only after 24 hours.

The mechanical properties of the moulding material, compared with those of the pure grafted copolymer, are retained.

EXAMPLE 2

95 Parts of the grafted copolymer used in Example 1 are mixed in a worm at 300°C with 5 parts polymethyl methacrylate (molecular weight MW about 130,000) and the mixture is extruded. The product has the mechanical properties of the pure grafted copolymer but a noticeably improved stably to alkali. In the rinsing test described in Example 1, a flat rod shows cloudiness only after 24 hours. Breaking of the test rod has not yet occurred within this period of time.

EXAMPLE 3

90 Parts of the grafted copolymer used in Example 1 are mixed in a worm at 300°C with 10 parts of the polymethyl methacrylate of Example 2. The product has excellent mechanical properties. A flat rod produced therefrom resists the rinsing test described in Example 1 for 24 hours without damage and remains completely transparent. The rinsing test was broken off after the said period of time.

EXAMPLE 4

90 Parts of the grafted copolymer used in Example 1 are mixed in a worm at 290°C with 10 parts polystyrene (molecular weight MW about 230,000) and the mixture is extruded. The flow properties are substantially improved by the admixture of the polystyrene. The mixture shows a false melting viscosity of $2 \times 10^3$ poises at a deformation rate of $10^3 cm^{-1}$, whereas the pure graft copolymer has a false melting viscosity of $10^4$ poises at a deformation rate of $10^3 cm^{-1}$.

EXAMPLE 5

80 Parts polystyrene and 20 parts of the grafted copolymer described in Example 1 are mixed at 270°C in a worm and the mixture is extruded. Compared with the mixture described in Example 4, this mixture is even further improved. The false melting viscosity at a deformation rate of $10^3 cm^{-1}$ has fallen to $7 \times 10^2$ poises.

EXAMPLE 6

10 Parts of the grafted copolymer used in Example 1 are mixed in a worm at 180°C with 90 parts polystyrene and the mixture is extruded. Compared with pure polystyrene, this mixture shows an improvement of the thermal stability. The MARTENS degree according to VDE 0302 increases from 71° to 82° C.

EXAMPLE 7

90 Parts of a polycarbonate-grafted vinyl polymer with a relative viscosity of 1.302 [grafted base (5 parts): 95 parts methyl methacrylate and 5 parts p-isopropenylphenol-trimethylsilyl ether; graft (95 parts): polycarbonate from 50 parts bisphenol A and 50 parts 3,3', 5,5'-tetrachloro-4,4'-dihydroxydiphenylpropane,2,2] are mixed in a worm at 300°C with 10 parts polystyrene and the mixture is extruded. This mixture resists the rinsing test described in Example 1 for 24 hours without damage.

EXAMPLE 7a

50 Parts of the polycarbonate-grafted vinyl copolymer used in Example 1 are mixed in a worm at 240°C with 50 parts of a graft copolymer of the ABS-type. (The ABS-copolymer is a mixture of 25 parts of 1) a copolymer of 50 parts of butadiene, 36 parts of styrene and 14 parts of acrylonitrile with 75 parts of a 2) copolymer based on 72 parts of styrene and 28 parts of acrylontrile.) The false melting viscosity at a deformation rate of $10^3 cm^{-1}$ has fallen to $8 \cdot 10^2$ poises whereas the pure polycarbonate-grafted vinylcopolymer of Example 1 has a false melting viscosity of $10^4$ poises at a deformation rate of $10^3 cm^{-1}$.

The pure grafted copolymer breaks already after 10 hours under test conditions as described.

A further modification of the invention provides the above grafted polymers with thermoplastic aromatic polycarbonates, containing 5 – 95 % of said thermoplastic polycarbonates.

Compared with polycarbonate, these moulding materials are characterized by a noticeably improved stability to alkali and hot water. On the other hand, their mechanical properties are improved over those of pure polycarbonate-grafted copolymers and come near to those of the polycarbonates, especially in respect to tensile elongation behaviour, impact strength, impact strength (notched) and dimensional stability under heat. The known steep decrease of the impact strength (notched) of polycarbonates at a critical thickness is not observed in the new moulding materials, while the excellent electric properies of the polycarbonates are retained. These products are suitable for articles having improved tensile strength and improved resistance to hydrolysis compared with polycarbonate articles based on bis-2-(4-hydroxyphenyl)-propane.

Suitable thermoplastic aromatic polycarbonate for the preparation of the blends are polycarbonates form dihydroxy phenols, e.g. hydroquinone, resorcinol, 4,4'-dihydroxydiphenyl, bis-(4-hydroxyphenyl)-alkanes, -cycloalkanes, -ethers, -sulphides, -sulphones, -sulphoxides, -ketones, and from bisphenols which are substituted in the phenyl radicals by halogen atoms such as chlorine or bromine as mentioned for example on page 3 lines 20ff, and from $\alpha,\Delta'$-bis-(hydroxyphenyl)-diisoalkyl-benzenes e.g. $\alpha,\alpha'$-bis(4-hydroxy-phenyl)-p-diisopropylbenzene. They are prepared in known manner by reacting dihydroxy phenols with a polycarbonate-forming derivative of carbonic acid.

About 454 parts of 4,4'-dihydroxydiphenyl-2,2-propane and about 9.5 parts of p-tertiary-butylphenol are suspended in about 1.5 liters of water. In a three-neck flask equipped with agitation and a gas addition tube, oxygen is removed from the mixture by blowing nitrogen through it while agitating for about 15 minutes. Then about 355 parts of 45 percent sodium hydroxide and about 1,000 parts of methylene chloride are added. The mixture is cooled to about 25°C. While maintaining this temperature by cooling, about 237 parts of phosgene are added uniformly over about a 120 minute period. An additional about 75 parts each of a 45 percent sodium hydroxide solution are added after about 15 to 30 minutes respectively after the phosgene addition has begun. To the resulting solution, about 1.6 parts of triethylamine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried. The polycarbonate has a relative viscosity of 1.32 measured from a 0.5 percent solution of methylene chloride at 20°C, equivalent to approximately a 34,000 molecular weight product.

EXAMPLE 8

80 Parts of polycarbonate-grafted copolymer (component I) with a relative viscosity of 1.466 [graft base (15 parts): copolymer from 83 parts styrene, 13.5 parts acrylonitrile and 3.5 parts p-isopropenylphenol-trimethylsilyl ether; graft (85 parts): polycarbonate from 4,4'-dihydroxydiphenyl-propane-2,2 (Bisphenol A)] and 20 parts of a polycarbonate from bisphenol A as described above with a relative viscosity of 1.300 are dissolved in 1000 parts of methylene chloride.

From this solution there is extruded a transparent colourless film the mechanical properties of which are given in the Table.

EXAMPLE 9

1 Part of the graft polymer used in Example 8 is mixed in a melt at 280°C with 2 parts of the polycarbonate from bisphenol A (according Example 8) and the mixture is extruded. The mechanical properties were measured on completely transparent colourless films and are assembled in the Table.

EXAMPLE 10

1 Part of a polycarbonate-grafted copolymer (component II) with a relative viscosity of 1.356 [graft base (30 parts): copolymer from 38 parts styrene, 57 parts butyl acrylate and 5 parts p-isopropenylphenol-trimethylsilyl ether; graft (70 parts): polycarbonate from bisphenol A] and 1 part of the polycarbonate from bisphenol A (according Example 8) are dissolved in 10 parts by methylene chloride. From this solution there is extruded a transparent colourless film the mechanical properties of which are given in the Table.

EXAMPLE 11

5 Parts of a polycarbonate-grafted copolymer (component III) with a relative viscosity of 1.305 [graft base (10 parts): copolymer from 47.5 parts styrene, 47.5 parts methyl methacrylate and 5 parts p-isopropenylphenol-trimethylsilyl ether; graft (90 parts): polycarbonate from bisphenol A] are mixed in a melt at 300°C with 95 parts of this polycarbonate of Example 8 and the mixture is extruded. The mechanical properties were measured on transparent colourless films and are given in the Table.

EXAMPLE 12

95 Parts of the grafted copolymer used in Example 11 are mixed in a melt at 290°C with 5 parts of a polycarbonate from bisphenol A (according Example 8) and the mixture is extruded. The mechanical properties measured on completely transparent and colourless films are assembled in the Table.

EXAMPLE 13

5 Parts of a polycarbonate-grafted copolymer (component IV) with a relative viscosity of 1.371 [graft base (30 parts): copolymer from 96.5 parts methyl methacrylate and 3.5 parts p-isopropenylphenol-trimethylsilyl ether; graft (70 parts): polycarbonate from bisphenol A] and 95 parts of a polycarbonate from bisphenol A (according Example 8) are dissolved in 1000 parts methylene chloride. A transparent and colourless film is extruded the mechanical properties of which are assembled in the Table.

EXAMPLE 14

10 Parts of the polycarbonate-grafted copolymer described in Example 8 are mixed in a melt with a. 90 parts of a polycarbonate from 50 molar percent bisphenol A and 50 molar percent 4,4'-dihydroxydiphenylcyclohexane-1,1 with a relative viscosity of 1.262;

b. 90 parts of a polycarbonate from 10 molar percent 4,4'-dihydroxy-3,3',5,5'-tetrachloridiphenyl-propane-2,2 and 90 molar percent bisphenol A with a relative viscosity of 1.281;

c. 90 parts of a polycarbonate from 20 molar percent $\alpha,\alpha'$-bis-(p-hydroxyphenyl)-p-diisopropylbenzene and 80 molar percent bisphenol A with a relative viscosity of 1.324.

The mixtures are transparent and colourless. Their mechanical properties are assembled in the Table.

EXAMPLE 15

1 Part of the polycarbonate-grafted copolymer described in Example 8 (component I) is mixed in a melt at 270°C with 9 parts of the polycarbonate from bisphenol A (according Example 8) and the mixture is extruded. This mixture shows an appreciable improvement of the impact strength (notched) (52 kg/cm according to DIN 53 453). The impact strength of the polycarbonate-grafted copolymer amounts to 13 kg/cm.

Tensile elongation behaviour of the mixtures prepared according to Examples 8 – 14, are measured on films:

|  | Elongation* % | Impact** strength m kp/cm² | Elongation-*** impact strength % |
| --- | --- | --- | --- |
| Component I | 120 | 439 | 4 |
| Mixture of Ex. 8 | 124 | 567 | 12.4 |
| Mixture of Ex. 9 | 126 | 1279 | 42.3 |
| Component II | 19 | 247 | — |
| Mixture of Ex. 10 | 103 | 339 | 4 |
| Component III | 55 | 478 | 11 |
| Mixture of Ex. 12 | 24 | 467 | 6.6 |
| Mixture of Ex. 11 | 76 | 825 | 25 |
| Component IV | 9 | 238 | — |
| Mixture of Ex. 13 | 142 | 1883 | 59.8 |
| Component I | 120 | 439 | 4 |
| Mixture of Ex. 14a | 140 | 1130 | 31.5 |
| Mixture of Ex. 14b | 127 | 981 | 27.4 |
| Mixture of Ex. 14c | 143 | 1410 | 34.8 |

* according to DIN 53 455
** according to DIN 53 448
*** according to DIN 53 448

According to a further modification the invention provides blends of the above grafted polymers with the thermoplastic aromatic polycarbonates and the vinyl-polymers disclosed above.

In these blends (D) each component
A. (thermoplastic graft copolymer),
B. (vinyl polymer olefinically unsaturated monomers), and
C. (aromatic polycarbonate) may be present in any amount, with the proviso that the blend (D) contains at least 5 percent by weight of component (A), at least 5 % by weight of component (B) and at least 5 % by weight of component (C) and the total amount is 100 % by weight.

A preferred mixture contains 5 – 95 % by weight of component (C) as calculated on the sum (= 100 % by weight) of thermoplastic graft polymer (A) and aromatic polycarbonate (C), and additionally 5 – 100 % by weight preferably 5–20% by weight of component (B) referred to the sum of the components (A) and (C).

The moulding materials according to the different modifications of the invention can be prepared, for example, by mixing solutions of the two or three mixing components in a solvent or solvent mixture suitable for both mixing components. Other additives, such as dye-stuffs, stabilizers or effect substances, can be incorporated in these solutions, if desired. Effect substances are e.g. fillers and pigments adapted to obtain certain surface structures and qualities (e.g. a metal effect).

The moulding materials can then be isolated from such solutions by precipitation with non-solvents or by evaporation of the solvents. Suitable solvents are, for example, chlorinated aliphatic hydrocarbons, such as methylene chloride, chloroform and trichloroethane; and halogenated aromatics such as chlorobenzene. Non-solvents are preferably alcohols such as methanol, ethanol and isopropanol.

Another method of preparing the moulding materials according to the invention consists in mixing the components in extruders fitted with mixing units; the components can then be melted together and extruded, or the melts of the mixing components can be brought together, mixed and extruded.

The new moulding masses can be used for the production of moulded articles, films, foils and filaments which are subjected to high permanent stress through alkalies and boiling water. Furthermore, the moulding masses can be used whenever better flow properties than those of polycarbonate-grafted copolymers are desired or also when vinyl polymers are to be improved in respect of their permanent thermal stability.

The three-component mixtures offer the following advantages: by admixing the vinyl polymers to the polycarbonate-grafted copolymers the hydrolysis stability is substantially increased, compared with polycarbonate and also with polycarbonate-grafted copolymers. Improved flow properties are also achieved. On the other hand, the mechanical and thermal properties are substantially improved by the admixture of polycarbonate, while the hydrolysis stability and the good flow properties are retained. For example, a flat rod (length 12 cm, width 1 cm, thickness 0.4 cm) of a mixture consisting of 55 parts by weight of an aromatic polycarbonate, from bisphenol A, 5 parts by weight polystyrene and 40 parts by weight of a polycarbonate-grafted copolymer [graft base (5 parts by weight): 79 parts by weight styrene, 15 parts by weight acrylonitrile and 5 parts by weight isopropenylphenol-trimethylsilyl ether; graft (95 parts by weight): polycarbonate from 4,4'-dihydroxy-diphenyl-propane-2,2] has not broken after 48 hours' storage in a concentrated wetting agent solution at 60°C under a bending stress of 800 kp/sq.cm, whereas polycarbonate breaks after 1 hour and the polycarbonate-grafted copolymer after 6 hours under the same test conditions (rinsing test).

These three component mixtures are useful for producing articles having improved mechanical properties and improved flow properties in combination with improved resistance to hot water and alkaline solutions; they can for example serve for the manufacture of crockery, pipelines for hot water and alkaline solutions, housing for household appliances (e.g. coffee grinders, juice extractors) or for office machines (e.g. adding machines, typewriters or small computers).

EXAMPLE 16

40 Parts of a polycarbonate-grafted copolymer with a relative viscosity of 1.336 [graft base (5 parts): 79 parts styrene, 16 parts acrylonitrile and 5 parts p-isopropenylphenol-trimethylsilyl ether; graft (95 parts): polycarbonate from 4,4-dihydroxy-diphenyl-propane-2,2] are mixed in a worm at 270°C with 55 parts of a polycarbonate from 4,4'-dihydroxy-diphenyl-propane-2,2 (according Example 8) and 5 parts polystyrene and the mixture is extruded.

Compared with polycarbonate and the polycarbonate-grafted copolymer, the moulded articles produced from this mixture are characterised by an improved stability to alkalies which is measured as follows: a flat rod (length 12 cm, width 1 cm, thickness 0.4 cm) is subjected at 60°C in a concentrated wetting agent solution (pH 12) to a bending stress of 800 kp/sq.cm (rinsing test). Any formation of cracks, cloudiness and, finally, breaking of the test rod are observed. Whereas a flat rod of the polycarbonate-grafted copolymer exhibits cloudiness after 5 hours and breaks after 6 hours, a flat rod made of the mixture resists the test for 48 hours without damage. The rinsing test and some mechanical properties are assembled in the following Table.

Example 17

40 Parts of the polycarbonate-grafted copolymer used in Example 16 are mixed in a melt at 270°C with 50 parts of polycarbonate from 4,4'-dihydroxy-diphenyl-propane-2,2 (according Example 8) and 10 parts polystyrene and the mixture is extruded. This mixture gives a clear transparent moulded article. The rinsing test and some mechanical properties are again assembled in the Table. Compared with the copolymer, the mixture exhibits a reduced melting viscosity of $2 \times 10^3$ poises at a deformation rate of $10^3$ cm$^{-1}$. The false melting viscosity of the grafted copolymer amounts to $10^4$ poises at a deformation rate of $10^3$ cm$^{-1}$.

EXAMPLE 18

70 Parts of the grafted copolymer used in Example 16 are mixed in a melt at 300°C with 20 parts of polycarbonate from 4,4'-dihydroxy-diphenyl-propane-2,2- (according Example 8) and 10 parts polymethyl methacrylate and the mixture is extruded. The properties of this mixture are assembled in the Table.

EXAMPLE 19

60 Parts of the grafted copolymer used in Example 16 are mixed in a melt at 290°C with 35 parts of polycarbonate from 4,4'-dihydroxy-diphenyl-propane-2,2 (according Example 8) and 5 parts of a copolymer from 80 parts styrene and 20 parts acrylonitrile and the mixture is extruded. The mechanical properties and the rinsing test are assembled in the Table.

EXAMPLE 20

50 Parts of a polycarbonate-grafted copolymer with a relative viscosity of 1.290 [graft base (5 parts): copolymer from 47.5 parts styrene, 47.5 parts methyl methacrylate and 5 parts p-isopropenylphenoltrimethylsilyl ether; graft (95 parts): polycarbonate from 4,4'-dihydroxydiphenyl-propane-2,2] are mixed in a worm at 290°C with 40 parts polycarbonate from 4,4'-dihydroxy-diphenyl-propane-2,2(according Example 8) and 10 parts polystyrene and the mixture is extruded. The mechanical properties are assembled in the Table.

EXAMPLE 21

20 Parts of a polycarbonate-grafted copolymer with a relative viscosity of 1.302 [graft base (5 parts): 95 parts methyl methacrylate and 5 parts p-isopropenylphenol-trimethylsilyl ether; graft (95 parts): polycarbonate from 50 parts 4,4'-dihydroxydiphenyl-propane-2,2 and 50 parts 3,3',5,5'-tetrachloro-4,4'-dihydroxy-diphenyl-propane-2,2] are mixed in a melt at 300°C with 70 parts of a polycarbonate from 4,4'-dihydroxy-diphenyl-propane-2,2(according Example 8) and 10 parts polystyrene and the mixture is extruded. Some mechanical properties are assembled in the Table.

EXAMPLE 22

80 Parts of the grafted copolymer used in Example 20, 10 parts of a polycarbonate from 4,4'-dihydroxydiphenyl-propane-2,2 (according to Example 8) and 10 parts polystyrene are mixed in a melt at 290°C and the mixture is extruded. The flow properties are appreciably improved by the admixing of polystyrene. For example, the mixture described in Example 22 exhibits a false melting viscosity of $10^3$ poise at a deformation rate of $10^3$ cm$^{-1}$, whereas the pure grafted copolymer has a false melting viscosity of $10^4$ poises at a deformation rate of $10^3$ cm$^{-1}$.

EXAMPLE 23

20 Parts of a polycarbonate-grafted copolymer as used in Example 16 are mixed with 30 parts of a polycarbonate from 4,4'-dihydroxydiphenylpropan-2.2 (according to Example 8) and 50 parts of a copolymer based on butadiene, styrene and acrylonitrile (as described in Example 7a) are mixed in a melt at 250°C. The rinsing test and some mechanical properties are assembled in the following Table.

EXAMPLE 24

40 Parts of a polycarbonate-grafted copolymer as used in Example 20 are mixed with 20 parts of a polycarbonate from 4,4'-dihydroxy-diphenylpropan-2.2 (according to Example 8) and 40 parts of a copolymer based on butadiene, styrene and acrylonitrile (as described in Example 7a) are mixed in a melt at 270°C. The rinsing test and some mechanical properties are assembled in the following Table.

TABLE

|  | Rinsing test | Impact strength (notched) cmkp/cm² | Elongation % | MARTENS degree °C |
|---|---|---|---|---|
| Polycarbonate | after 1H break | 50 | 100 | 115 |
| grafted copolymer of Example 16 | after 6H break | 19 | 90 | 93 |
| mixture of Example 16 | after 48H good | 25 | 100 | 93 |
| mixture of Example 17 | after 24H good | 18 | 90 | 98 |
| mixture of Example 18 | after 18H break | 18 | 85 | 93 |
| mixture of Example 19 | after 20H break | 25 | 90 | 101 |
| mixture of Example 23 | after 48H good | 28 | 110 | 105 |
| grafted copolymer of Example 20 | after 10H break | 25 | 100 | 98 |
| mixture of Example 20 | after 24H good | 30 | 100 | 94 |
| mixture of Example 24 | after 24H good | 32 | 100 | 100 |
| grafted copolymer of Example 21 | after 10H break | 18 | 70 | 89 |
| mixture of Example 21 | after 24H good | 30 | 100 | 93 |

What is claimed is:
1. Blends comprising:
   A. 5–95% by weight of a thermoplastic graft copolymer of
      i. 5–50% by weight, based on the weight of the graft copolymer, of a polymer backbone having from 0.1–1.5% by weight of aromatic hydroxyl groups, said polymer backbone being the reaction product of (a) an unsaturated monomer having aromatic hydroxyl groups and (b) an unsaturated monomer copolymerizable with (a), and
      ii. 95–50% by weight of an aromatic polycarbonate grafted onto the polymer backbone by way of the said aromatic hydroxy groups; said graft copolymer having a number average molecular weight of between 10,000 and 200,000 and corresponding to the formula:

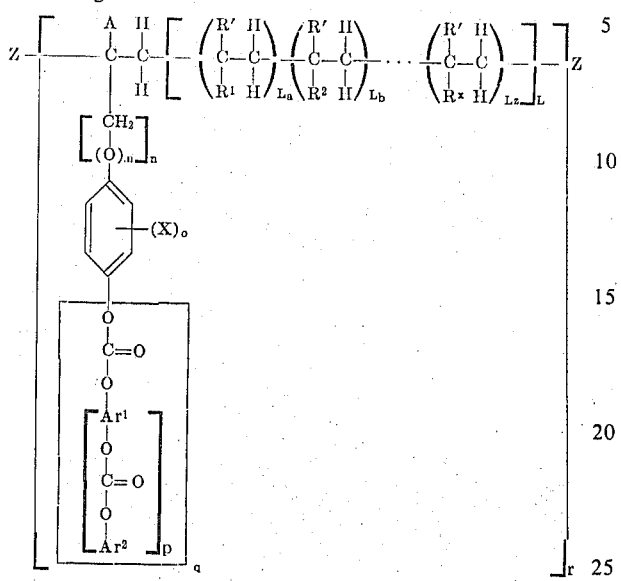

in which $R^1$, and $R^2, \ldots R^x$, which may be the same or different, are each a hydrogen or halogen atom or an alkyl radical having up to 6 carbon atoms or an aryl radical, or a monohydric alcohol ester radical, or an amide, nitrile, carboxylic acid ester or alkyl ether radical;

$R'$ is a hydrogen atom or a methyl radical;
A is a hydrogen atom or a methyl radical;
X is a halogen atom or a methyl radical;
$Ar^1$ is a bivalent aromatic radical derived from a dihydric phenol and which may be substituted in the phenyl radical by chlorine, bromine or a methyl group;
$Ar^2$ is phenyl, halophenyl or alkylphenyl, or is the radical $Ar^1$ with one hydroxy group;
L is a number from 1 to 200;
$L_a, L_b \ldots L_z$ are identical or different integers; the product $(L_a + L_b + \ldots + L_z) \cdot L$ is a number from 9 to 200;
m is zero or 1;
n is zero or 1;
o is zero, 1 or 2;
p is an integer from 5 to 100;
q is 1 or 2; and
r is an integer from 1 to 10; and
Z is $$NC-\underset{\underset{CH_3}{|}}{\overset{\overset{CH_3}{|}}{C}}-,$$

H-, $C_6H_5COO-$ or $C_6H_5-$; and

B. 95-5% by weight of a thermoplastic-polymer of vinyl monomers selected from the group consisting of: ethylene, propylene, butadiene, vinyl acetate, vinyl benzoate, vinyl isobutylether, acrylamide, methacrylamide, N-methoxy-methyl-metacrylamide, acrylonitrile, methacrylonitrile, acrylic acid esters, methacrylic acid esters, styrene, vinyl toluene, 2,4-dimethyl-styrene, chlorostyrene and α-methyl-styrene.

2. Blends comprising:

A. 5-95% by weight of a thermoplastic graft copolymer of i. 5-50% by weight, based on the weight of the graft copolymer, of a polymer backbone having from 0.1-1.5% by weight of aromatic hydroxyl groups, said polymer backbone being the reaction product of (a) an unsaturated monomer having aromatic hydroxy groups and (b) an unsaturated monomer copolymerizable with (a), and ii. 95-50% by weight of an aromatic polycarbonate grafted onto the polymer backbone by way of the said aromatic hydroxy groups; said graft copolymer having a number average molecular weight of between 10,000 and 200,000 and corresponding to the formula:

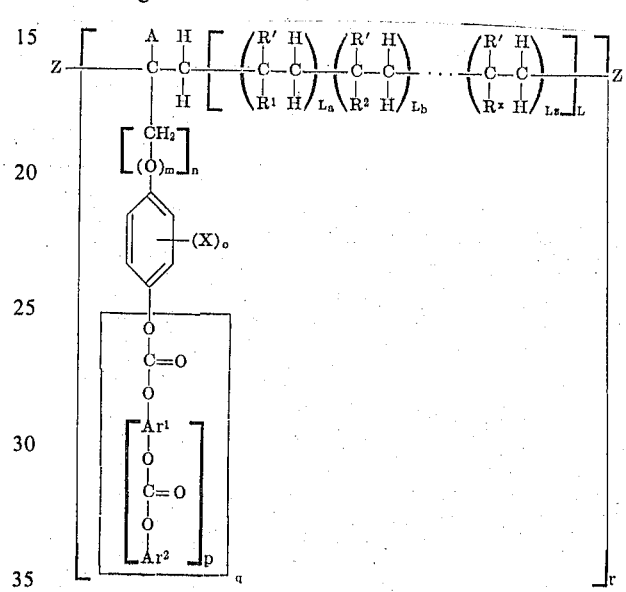

in which $R^1$, and $R^2, \ldots R^x$, which may be the same or different, are each a hydrogen or halogen atom or an alkyl radical having up to 6 carbon atoms or an aryl radical, or a monohydric alcohol ester radical, or an amide, nitrile, carboxylic acid ester or alkyl ether radical;

$R'$ is a hydrogen atom or a methyl radical;
A is a hydrogen atom or a methyl radical;
X is a halogen atom or a methyl radical;
$Ar^1$ is a bivalent aromatic radical derived from a dihydric phenol and which may be substituted in the phenyl radical by chlorine, bromine or a methyl group;
$Ar^2$ is phenyl, halophenyl or alkylphenyl or is the radical $Ar^1$ with one hydroxy group;
L is a number from 1 to 200;
$L_a, L_b \ldots L_z$ are identical or different integers; the product $(L_a + L_b + \ldots + L_z) \cdot L$ is a number from 9 to 200;
m is zero or 1;
n is zero or 1;
o is zero, 1 or 2;
p is an integer from 5 to 100;
q is 1 or 2; and
r is an integer from 1 to 10, and
Z is

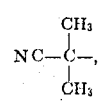

H–, $C_6H_5COO$—or $C_6H_5-$; and

B. 95-5% by weight of a thermoplastic aromatic polycarbonate derived from a dihydric phenol.

3. Blends comprising:
A. 5–95% by weight of a thermoplastic graft copolymer of
   i. 5–50% by weight, based on the weight of the graft copolymer, of a polymer backbone having from 0.1–1.5% by weight of aromatic hydroxyl groups, said polymer backbone being the reaction product of (a) an unsaturated monomer having aromatic hydroxyl groups and (b) an unsaturated monomer copolymerizable with (a) and,
   ii. 95–50% by weight of an aromatic polycarbonate grafted onto the polymer backbone by way of the said aromatic hydroxy groups; said graft copolymer having a number average molecular weight of between 10,000 and 200,000 and corresponding to the formula $$Z - \left[ \begin{array}{c} A\ H \\ | \ \ | \\ C-C \\ | \ \ | \\ H \\ \left[ CH_2 \atop (O)_m \right]_n \\ \phantom{x} \\ \phantom{x}-(X)_o \\ \phantom{x} \\ O \\ | \\ C=O \\ | \\ O \\ | \\ \left[ Ar^1 \right] \\ | \\ O \\ | \\ C=O \\ | \\ O \\ | \\ Ar^2 \end{array} \right]_p \left[ \left( \begin{array}{c} R'\ H \\ | \ \ | \\ C-C \\ | \ \ | \\ R^1\ H \end{array} \right)_{L_a} \left( \begin{array}{c} R'\ H \\ | \ \ | \\ C-C \\ | \ \ | \\ R^2\ H \end{array} \right)_{L_b} \ldots \left( \begin{array}{c} R'\ H \\ | \ \ | \\ C-C \\ | \ \ | \\ R^x\ H \end{array} \right)_{L_z} \right]_L \bigg]_r Z$$

in which $R^1$, and $R^2$, ... $R^x$, which may be the same or different, are each a hydrogen or halogen atom or an alkyl radical having up to 6 carbon atoms or an aryl radical, or a monohydric alcohol ether radical, or an amide, nitrile, carboxylic acid ester or alkyl ether radical;

R' is a hydrogen atom or a methyl radical;
A is a hydrogen atom or a methyl radical;
X is a halogen atom or a methyl radical;
$Ar^1$ is a bivalent aromatic radical derived from a dihydric phenol and which may be substituted in the phenyl radical by chlorine, bromine or a methyl group;
$Ar^2$ is phenyl, halophenyl or alkylphenyl or is the radical $Ar^1$ with one hydroxy group;
L is a number from 1 to 200;
$L_a$, $L_b$ ... $L_z$ are identical or different integers; the product $(L_a + L_b + \ldots + L_z) \cdot L$ is a number from 9 to 200;
m is zero or 1;
n is zero or 1;
o is zero, 1 or 2;
p is zero, 1 is an integer from 5 to 100;
q is 1 or 2; and
r is an integer from 1 to 10, and
Z is $$NC-\underset{\underset{CH_3}{|}}{\overset{\overset{CH_3}{|}}{C}}-,$$

$H-$, $C_6H_5COO-$ or $C_6H_5-$; and

B. 95–5% by weight of a thermoplastic aromatic polycarbonate derived from a dihydric phenol, wherein said weight percentages are based on the total weight of component A and component B; and
C. 5–100% by weight, based on the total weight of component A an component B, of a thermoplastic polymer of vinyl monomers selected from the group consisting of: ethylene, propylene, butadiene, vinyl acetate, vinyl benzoate, vinyl isobutylether, acrylamide, methacrylamide, N-methoxy-methyl-metacrylamide, acrylonitrile, methacrylonitrile, acrylic acid esters, methacrylic acid esters, styrene, vinyl toluene, 2,4-dimethyl-styrene, chlorostyrene and α-methyl-styrene, with the proviso that each of the components A, B and C be present in an amount of about 5% by weight based on the total weight of the blend.

4. The blends of claim 1 wherein the polymer of vinyl monomers is an ABS graft copolymer.

5. The blends of claim 3 wherein the polymer of vinyl monomers is an ABS graft copolymer.

6. The blends of claim 2 wherein the aromatic polycarbonates of component A and component B are derived from a dihydric phenol selected from the group consisting of: bis 2-(4-hydroxyphenyl propane, bis-2(4-hydroxy-3,5-dichlorophenyl)-propane, bis-2-(4-hydroxy-3,5-dibromo-phenyl)-propane, bis-2-(4-hydroxy-3,5-dimethyl-phenyl)-propane, bis-(4-hydroxy-phenyl)-sulfone, α,α-bis-(4-hydroxy-phenyl)-p-diisopropyl benzene, hydroquinone, resorcinol and 4,4-dihydroxydiphenyl.

7. The blends of claim 3 wherein the aromatic polycarbonates of component A and component B are derived from a diphydric phenol selected from the group consisting of: bis-2-(4-hydroxyphenyl propane, bis-2-(4-hydroxy-3,5-dichlorophenyl)-propane, bis-2-(4-hydroxy-3,5-dibromo-phenyl)-propane, bis-2-(4-hydroxy-3,5-dimethyl-phenyl)-propane, bis-(4-hydroxy-phenyl)-sulfone, α,α4-hydroxy-phenyl)-p-diisopropyl benzene, hydroquinone, resorcinol and 4,4-dihydroxydiphenyl.

8. The blends of claim 1 wherein the copolymer backbone of the grafted copolymer has from 0.2 – 0.8% of aromatic hydroxy groups.

9. The blends of claim 2 wherein the polymer backbone of the grafted copolymer has from 0.2 – 0.8% of aromatic hydroxy groups.

10. The blends of claim 3 wherein the polymer backbone of the grafted copolymer has from 0.2 – 0.8% of aromatic hydroxy groups.

11. The blends of claim 1 wherein said graft copolymer is:
   a. 10–20% by weight backbone polymer, and
   b. 90–80% by weight aromatic polycarbonates.

12. The blends of claim 2 wherein said graft copolymer
   a. 10–20% by weight backbone polymer, and
   b. 90–80% by weight aromatic polycarbonates.

13. The blends of claim 3 wherein said graft copolymer
   a. 10–20% by weight backbone polymer, and
   b. 90–80% by weight aromatic polycarbonates.

14. The blends of claim 3 wherein the amount of component C is 5–20% by weight, based on the total weight of component A and component B.

15. The blends of claim 1 wherein the polymers of vinyl monomers are selected from the group consisting of polystyrene, polyacrylates, polymethylacrylates and copolymers of styrene and acrylonitrile.

16. The blends of claim 3 wherein the polymers of vinyl monomers are selected from the group consisting of polystyrene, polyacrylates, polymethacrylates and copolymers of styrene and acrylonitrile.

17. The blends of claim 1 comprising:
A. 50% by weight of said graft copolymer wherein said copolymer consists of:
  i. 5% by weight of a polymer backbone consisting of 78 parts styrene, 17 parts acrylonitrile and 5 parts p-isopropenylphenol-trimethylsilyl ether, and
  ii. 95% by weight of a polycarbonate of 4,4'-dihydroxydiphenylpropane-2,2 grafted onto the polymer backbone; and
B. 50% by weight of said polymer of vinyl monomers wherein said polymer is a mixture consisting of
  i. 25 parts of a copolymer of 50 parts butadiene, 36 parts styrene and 14 parts acrylonitrile and
  ii. 75 parts of a copolymer of 72 parts styrene and 28 parts acrylonitrile.

18. The blends of claim 3 comprising
A. 20% by weight of said graft copolymer wherein said copolymer consists of
  i. 5% by weight of a polymer backbone consisting of 79 parts styrene, 16 parts acrylonitrile and 5 parts p-isopropenylphenol-trimethylsilyl ether, and
  ii. 95% by weight of a polycarbonate of 4,4'-dihydroxy-diphenyl-propane-2,2, grafted onto the polymer backbone;
B. 30% by weight of said aromatic polycarbonate wherein said aromatic polycarbonate is a polycarbonate of 4,4'-dihydroxydiphenylpropane-2,2; and
C. 50% by weight of said polymer of vinyl monomers wherein said polymer is a mixture consisting of
  i. 25 parts of a copolymer of 50 parts butadiene, 36 parts styrene and 14 parts acrylonitrile and
  ii. 75 parts of a copolymer of 72 parts styrene and 28 parts acrylonitrile.

19. The blends of claim 3 comprising:
A. 40% by weight of said graft copolymer wherein said graft copolymer consists of:
  i. 5% by weight of a polymer backbone consisting of 47.5 parts styrene, 47.5 parts methyl methacrylate and 5 parts p-isopropenylphenol-trimethylsilyl ether, and
  ii. 95% by weight of a polycarbonate of 4,4'-dihydroxy-diphenyl-propane-2,2, grafted onto the backbone;
B. 20% by weight of said aromatic polycarbonate wherein said aromatic polycarbonate is a polycarbonate of 4,4'-dihydroxy-diphenylpropane-2,2; and
C. 40% by weight of said polymer of vinyl monomers wherein said polymer is a mixture consisting of
  i. 25 parts of a copolymer of 50 parts butadiene, 36 parts styrene and 14 parts acrylonitrile and
  ii. 75 parts of a copolymer of 72 parts styrene and 28 parts acrylonitrile.

* * * * *

UNITED STATES PATENT AND TRADEMARK OFFICE
CERTIFICATE OF CORRECTION

PATENT NO. : 3,856,886

DATED : December 24, 1974

INVENTOR(S) : Dieter Margotte, Hugo Vernaleken, Hermann Schnell

It is certified that error appears in the above-identified patent and that said Letters Patent are hereby corrected as shown below:

On the Title Page after "[21] Application No. 239,717" insert --Related U.S. Application Data [63] Continuation-in-part of Serial No. 137,050, filed April 23, 1971, abandoned--

Column 2, line 9, delete the number "3,255,119" and insert the number --3,225,119--; same column, lines 50-55, please correct that portion of the formula in brackets $$-- \left[ \begin{array}{c} CH_2 \\ (O)m \end{array} \right]_n --$$

to clearly indicate the subscript "m"

Column 3, delete lines 8 and 9 and rewrite them as --A is hydrogen or the methyl group; X is halogen or the methyl group;-- same column, line 14 beginning with "$Ar^1$" should be indented to clearly indicate that it is part of the definition of $Ar^2$ same column, line 48, delete "Those" and insert --The-- same column, line 64, delete the commas before and after the word "obtained"

Column 4, line 8, after "vinyl" insert --polymers--

Column 6, line 64, delete "form" and insert --from--; same column, line 67, correct the spelling of --sulphoxides--

Column 7, line 3, "$\alpha,\Delta'$" should read --$\alpha,\alpha'$ --

Column 8, line 9, "this" should be --the--

UNITED STATES PATENT AND TRADEMARK OFFICE
CERTIFICATE OF CORRECTION

PATENT NO. : 3,856,886
DATED : December 24, 1974
INVENTOR(S) : Dieter Margotte, Hugo Vernaleken, Hermann Schnell It is certified that error appears in the above-identified patent and that said Letters Patent are hereby corrected as shown below:

-- Page 2 --

Column 10, line 43 "4,4-" should be --4,4'- --

Column 13, lines 5 to 10 correct that portion of the formula within brackets

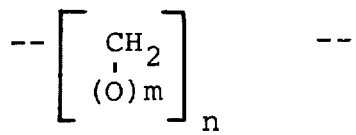

to clearly indicate the subscript "m"

Column 15, line 61, after "p is" delete "zero, 1 is"

Column 16, line 8, correct "an" to --and--; same column, line 43, delete " α,α4-hydroxy-phenyl)" and insert --α,α-bis-(4-hydroxy-phenyl)--; same column, line 46, correct "copolymer" so that it now reads --polymer--

Signed and Sealed this

Twenty-eighth Day of September 1976

[SEAL]

Attest:

RUTH C. MASON
*Attesting Officer*

C. MARSHALL DANN
*Commissioner of Patents and Trademarks*